Feb. 10, 1948. O. F. RITZMANN 2,435,903
METHOD AND APPARATUS FOR EXHIBITING SEISMOGRAPH SIGNALS
Filed Dec. 9, 1944

Inventor
O. F. RITZMANN
By G. M. Houghton
his Attorney

Patented Feb. 10, 1948

2,435,903

UNITED STATES PATENT OFFICE 2,435,903

METHOD AND APPARATUS FOR EXHIBITING SEISMOGRAPH SIGNALS

Otto F. Ritzmann, Takoma Park, Md., assignor to Gulf Research & Development Company, Pittsburgh, Pa., a corporation of Delaware Application December 9, 1944, Serial No. 567,465

4 Claims. (Cl. 177—352)

1

This invention relates to a method and apparatus for recording signals useful in seismograph prospecting. More particularly it concerns a method and apparatus by which one may simultaneously and with the same apparatus record on a seismograph film accurate timing marks and accurate shot moment or other sharp impulses.

In seismograph prospecting it is customary to set out on the ground a number of geophones electrically connected by cables to a central recording truck. A seismic earth disturbance is produced by a dynamite explosion in the vicinity, the seismic effects at the various geophones being recorded at the truck through amplifiers and conventional recording apparatus. In the operation of this system it is desirable to mark on the recording tape the instant at which the dynamite explosion takes place, commonly called the shot moment. The travel time of the various seismic waves is determined by simultaneously also marking on the tape timing intervals obtained from a standard timing device such as a tuning fork. In the so-called reflection type of seismograph prospecting the over-all distances involved are not very large, and it is customary to obtain the shot moment from the shot point over a wire connection, while timing is obtained from a device usually located in the recording truck. In so-called refraction operations, the distances involved become much greater, and it is customary to transmit the shot moment impulse by radio. If the terrain and the nature of the field set-up permit recording all the geophones at a central recording truck, the timing device may still be maintained in the truck at that point.

In many regions and in certain types of terrain it is impractical to connect a large number of geophones properly spaced to a central recording truck because of the physical difficulty in running out a large quantity of cable. Such conditions are met in heavily wooded and swampy regions, in water operations or in mountainous terrain. Conditions such as this require that each recording station be a portable unit and its weight must consequently be reduced to a minimum. Each recording station would in such an operation maintain radio equipment for communication and shot moment transmission, and must also have available an accurate timing source. It is desirable then to also transmit the timing signal as well as the shot moment impulse over the already available radio channel. By doing so one eliminates the weight and duplication of an accurate timing device at each recording station, only one

2 timing device being required and located only at the shot point. This arrangement also eliminates any inaccuracies in timing which might be introduced by having a multiplicity of timing units.

This invention accomplishes the above aim and has the advantage of reducing very materially the total amount of equipment required for portable operations thereby making such equipment more easily transported on mule back or by boat or by pack. Furthermore, it eliminates a precise timing standard from each portable unit and thereby reduces the care which must be taken in handling such equipment. This facilitates transportation when it must be done by men or animals.

It is accordingly an object of this invention to provide a method and means for simultaneously transmitting and recording over a single channel an accurate timing signal and an accurate shot moment impulse.

Another object of this invention is to momentarily and automatically suppress but not obliterate for a very short instant the timing signal while the shot moment signal is being transmitted and recorded.

A further object is to provide a method of obtaining a sharp shot moment signal when superimposed on a continuous timing signal.

While described here for operation over a radio channel, the invention may be applied as well if a wire connection is used. Details of the invention may be more fully understood by reference to the drawings in which.

Figure 1:
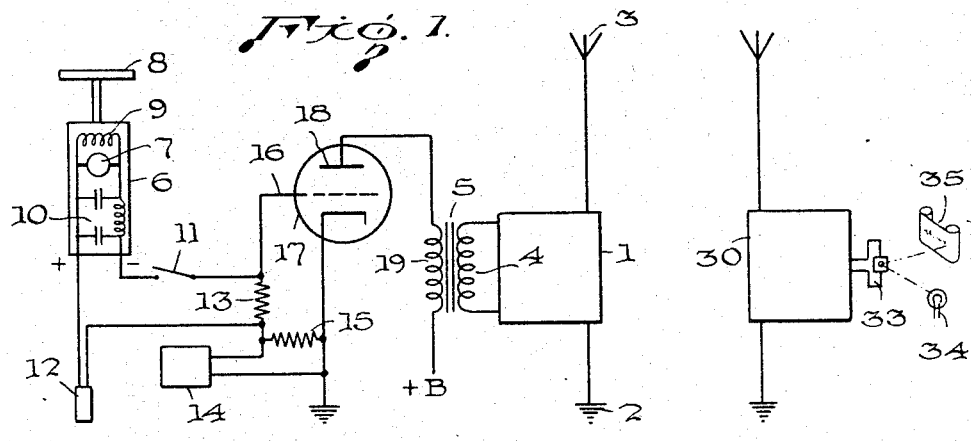
Fig. 1 is a circuit diagram showing one way of accomplishing the object of this invention.

Referring to Fig. 1, numeral 1 represents a conventional radio transmitter used at the shot location and having conventional ground connection 2 and antenna 3. Audio-signal input to the transmitter is indicated to be obtained from secondary coil 4 of transformer 5. Numeral 6 represents a hand-operated type of shot firing generator having an armature 7 caused to rotate by pushing handle 8. The rotation of the generator energizes shunt connected field coil 9 and the resulting generated voltage is filtered by a conventional low pass filter indicated by numeral 10. A safety switch 11 in series with the generator prevents it from delivering current until the operator is ready to fire. In series with the generated voltage is blasting cap 12 which ignites the dynamite. Resistor 13 permits a signal to be transferred from this cap circuit to the radio transmitter as will be described later.

A standard timing device is represented by numeral 14, usually comprising an electrically driven tuning fork vibrating at an accurately known frequency, say 100 cycles per second. Electric signal obtained from this fork may be continuously fed into the audio circuit of a radio transmitter and the shot moment signal from resistor 13 superimposed upon it. Recording may then be done over a single channel and with a single oscillograph. In the operation of this invention the shot moment will be unmistakably distinguishable on the trace, the timing signal being momentarily reduced just before the shot is fired. This reduction is automatically accomplished by the firing current so that the time interval during which the timing signal is suppressed is a minimum. The time may easily be interpolated on the recording tape since the tuning fork runs continuously and executes a whole number of cycles during the interval.

In the circuit of Fig. 1 the tuning fork signal is applied across resistor 15 which is in series with resistor 13 leading to the grid 16 of triode tube 17. Plate 18 of this tube connects through the primary 19 of transformer 5 to conventional plate supply. With switch 11 open, this circuit functions to impress a standard 100 cycle tuning fork signal on to the audio circuits of radio transmitter 1. This signal may be picked up at each geophone recording station by means of conventional radio receiving apparatus 30, the output of which is impressed on oscillograph galvanometer 33. This galvanometer may be one of the galvanometers of a conventional recording apparatus, and reflects a beam of light from lamp 34 to moving photographic tape 35 on which a permanent recording of the received signal is made by known photographic processes.

When the operator is ready to fire the shot, he may close safety switch 11 (Fig. 1). This does not affect the transmission of the timing signal. Firing is accomplished by pushing the handle 8 of the shooting machine. The polarity of connections is such that when a current is generated in the cap circuit, grid 16 becomes negative, thereby reducing the sensitivity of tube 17 and suppressing the timing signal transmitted through it. Current builds up in the cap circuit as the generator armature accelerates in velocity until eventually cap 12 fires and the dynamite explodes, opening the circuit at point 12. This immediately releases the excess negative bias on grid 16 resulting in a strong impulse being transmitted. The immediate return to the normal operating point for tube 17 permits immediate resumption of transmission of the timing signal.

Figure 2:
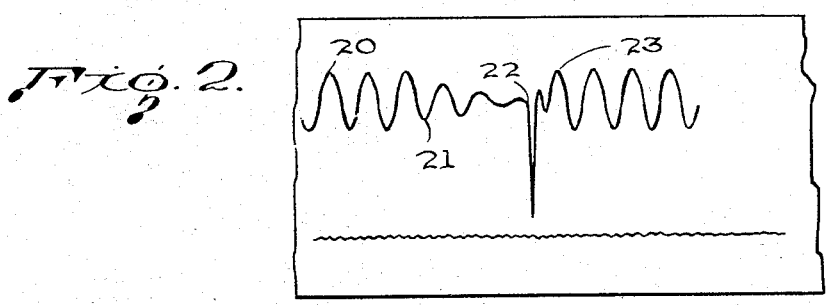
Fig. 2 shows a typical combination of timing and shot moment trace obtained by the use of this invention.

Fig. 2 shows a typical trace received by the operation of the above circuit. This is the trace which is recorded by the oscillograph 33 (Fig. 1) connected to the radio receiver 30 at the recording station. At 20 the record shows the normal 100 cycle timing signal recorded prior to firing. Beginning at 21 there is a gradual reduction in the timing signal lasting a small fraction of a second, this being the time during which the generator voltage builds up. At point 22 firing occurs with a sudden resumption of transmission of the timing signal at 23. Point 22 is seen to be an accurate indication of the shot moment because it shows no interference from the timing signal. During the firing interval one may still follow the timing almost up to the shot moment and resume it immediately thereafter so that there is no possibility of losing the accuracy of timing in the process of transmitting shot moment. The recording tape normally runs at a reasonably constant velocity and therefore the time intervals may easily be stepped off in the short interval between 21 and 22.

Figure 3:
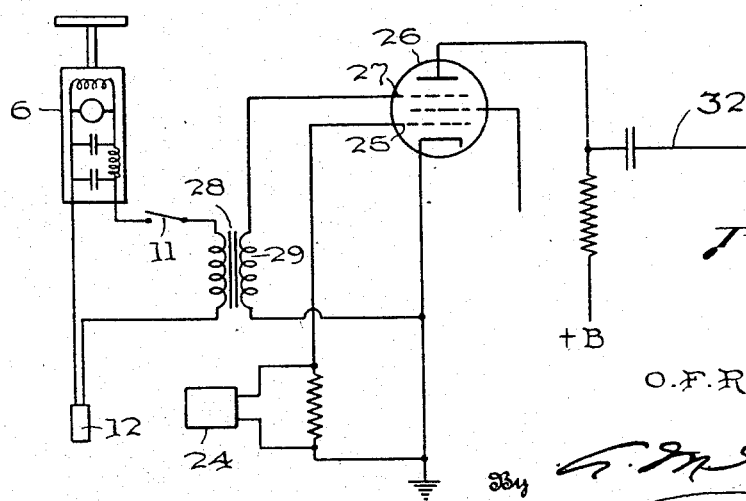
Fig. 3 shows another embodiment of the invention in which interconnection between the shot firing and timing device is avoided.

Instead of using a triode tube as shown in Fig. 1, the same result may be accomplished by using a pentode tube having a suppressor. This is shown in the circuit of Fig. 3 which has the further advantage of avoiding any interconnection between the tuning fork circuit and the shot moment circuit. The timing signal from unit 24 is fed into signal grid 25 of pentode 26. The shot moment signal is fed into the suppressor grid 27 of tube 26, coupling being provided by transformer 28. Shooting machine 6, cap 12 and switch 11 all have the same form and function as in Fig. 1. Connections to the secondary coil 29 of transformer 28 should be such that when the shooting machine plunger is pushed in for firing the shot, grid 27 becomes more negative. As the cap current increases, the suppressor grid then becomes more negative thus decreasing the amplification of tube 26. Thus the tuning fork signal is momentarily suppressed. The amplification suddenly returns to its normal value when the cap fires. A multi-grid mixer or converter tube could be used equally well. Plate connections from tube 26 to the radio transmitter may be through conventional coupling devices and connection 32.

In the operation of Fig. 3 the radio transmitter puts out a standard timing signal from the tuning fork until switch 11 is closed and the plunger of firing device 6 begins to move, thereafter the current slowly builds up in the cap. This rather slow transient generates sufficient negative bias on grid 27 to lower the amplification of tube 26 so that the recorded trace is relatively quiet as indicated in the region between 21 and 22 in Fig. 2. At the firing instant the cap circuit opens and grid 27 returns to its normal bias so that transmission of the timing signal is automatically resumed. The trace recorded by transmission from the circuit of Fig. 3 is similar to Fig. 2 previously described.

For simplicity in Figs. 1 and 3, the connections to plate supply, heater supply, screen and grid bias voltages are not shown since these are conventional. In all cases the normal operating voltages are such that when the firing current is applied to cap 12, the resulting change in bias on grid 16, Fig. 1, or grid 27, Fig. 3, will effect a reduction in amplification.

While I have indicated in this invention a method of automatically suppressing the timing signal in order to obtain on the trace a clearly defined shot moment impulse, it may alternatively be applied to a communication channel. Impulses of the type which gradually increase and suddenly break off may be by this method superimposed on speech or other intelligence taking the place of tuning fork units 14 or 24, respectively. It is noted that the method of this invention does not cause the signals to be mixed in the ordinary sense, but rather that the second signal is made to automatically suppress the first signal. In this way the second signal does more than merely make itself felt over and above the first signal; the second signal automatically turns off the first until its own intelligence has been transmitted.

What I claim as my invention is:

1. An apparatus for transmitting over a single channel a relatively continuous signal and a superimposed slowly increasing and sharply decreasing intelligible impulse signal, comprising a transmission channel, signal input means, means for introducing therein a relatively continuous signal, means for introducing therein a slowly increasing and sharply decreasing intelligible impulse signal, means by which the increase of the intelligible impulse signal reduces the sensitivity of the signal input means, said means permitting immediate return to normal sensitivity upon completion of said intelligible impulse signal.

2. In a seismograph signalling system, apparatus for transmitting and recording on a single channel a steady timing signal and a slowly increasing and sharply decreasing shot moment signal comprising a transmission channel, means for generating a steady timing signal, means for impressing said timing signal on an element of an amplifying tube in said channel at conditions of a normal operating point for said tube, means for generating a slowly increasing and sharply decreasing shot moment signal, means for impressing said shot moment signal on an element of an amplifying tube in said channel at operating conditions such that the slow increase of the shot moment signal reduces the amplification of said tube and the sharp decrease of said shot moment signal restores the amplification of said tube, thereby immediately returning said channel to normal operation substantially in time coincidence with said shot moment signal.

3. In a signalling system, apparatus for transmitting on a single channel a steady alternating voltage signal and a relatively infrequent unidirectional impulse signal comprising a transmission channel, means for generating a steady alternating voltage signal, means for impressing said alternating voltage signal on an element of an amplifying tube in said channel at conditions of a normal operating point for said tube, means for generating a slowly increasing and sharply decreasing unidirectional voltage signal, means for impressing said unidirectional voltage signal on an element of an amplifying tube in said channel at operating conditions such that said slow increase of the unidirectional voltage signal reduces the amplification of said tube and said sharp decrease of the unidirectional voltage signal restores amplification of said tube, thereby immediately returning said channel to normal operation substantially in time coincidence with said sharp decrease of unidirectional voltage signal.

4. In a seismograph signalling system, the method of transmitting on a single channel a timing signal and a shot moment signal which comprises generating an alternating timing signal, impressing said alternating timing signal on the channel at conditions of normal operation, generating a slowly increasing and sharply decreasing shot moment signal whose sharp decrease indicates the shot moment, impressing said shot moment signal on said transmission channel at conditions such that it slowly increases and sharply decreases the attenuation of said transmission channel, whereby the instant of said sharp decrease in attentuation may be indicative of the shot moment.

OTTO F. RITZMANN.

REFERENCES CITED

The following references are of record in the file of this patent:

UNITED STATES PATENTS

| Number | Name | Date |
| --- | --- | --- |
| 1,902,650 | Legg | Mar. 21, 1933 |
| 2,075,285 | Hollingsworth | Mar. 30, 1937 |
| 2,192,189 | Haffcke | Mar. 5, 1940 |
| 2,321,971 | Becker | June 15, 1943 |
| 2,326,153 | Mayne | Aug. 10, 1943 |
| 2,360,466 | Bedford et al. | Oct. 17, 1944 |
| 2,369,082 | Shook et al. | Feb. 6, 1945 |